(12) United States Patent
Nakayama

(10) Patent No.: US 9,811,069 B2
(45) Date of Patent: Nov. 7, 2017

(54) SERVOMOTOR CONTROL APPARATUS

(71) Applicant: FANUC CORPORATION, Yamanashi (JP)

(72) Inventor: Kiyoshi Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/226,103

(22) Filed: Aug. 2, 2016

(65) Prior Publication Data

US 2017/0038748 A1 Feb. 9, 2017

(30) Foreign Application Priority Data

Aug. 4, 2015 (JP) .................................. 2015-154161

(51) Int. Cl.
  *H02P 3/14* (2006.01)
  *G05B 19/042* (2006.01)

(52) U.S. Cl.
  CPC .. *G05B 19/042* (2013.01); *G05B 2219/25023* (2013.01)

(58) Field of Classification Search
  CPC . B65H 59/16; G06F 19/00; B60L 7/10; H02P 3/14; H02P 3/16; H02P 3/18
  USPC .............. 318/375, 376, 377, 560, 371, 372, 318/400.01, 400.14, 400.15, 700, 701, 318/727, 779, 799, 800, 801; 180/244, 180/276, 370; 188/4 B, 24.14, 24.18, 188/73.33, 79.55, 84, 140 A, 206 R, 157, 188/159; 477/4, 9, 40, 71, 92, 182
  See application file for complete search history.

(56) References Cited

U.S. PATENT DOCUMENTS 5,707,115 A * 1/1998 Bodie ..................... B60T 8/267
                                                                    180/165
9,537,431 B2 * 1/2017 Sawamura ............... H02P 3/04

FOREIGN PATENT DOCUMENTS

| JP | 11180687 A | 7/1999 |
| JP | 200047732 A | 2/2000 |
| JP | 2005254410 A | 9/2005 |
| JP | 2012213844 A | 11/2012 |

OTHER PUBLICATIONS

English Abstract and Machine Translation for Japanese Publication No. 2005-254410 A, published Sep. 22, 2005, 48 pgs.

(Continued)

*Primary Examiner* — Antony M Paul
(74) *Attorney, Agent, or Firm* — Fredrikson & Byron, P.A.

(57) ABSTRACT

A servomotor control apparatus according to the present invention is a control apparatus for controlling a machine having one or a plurality of movable portions each driven by a servomotor. In the servomotor control apparatus, while an electromagnetic brake is operated, an actual position obtained by a position detector is periodically monitored. The actual position is compared with the actual position at the time of actuating the electromagnetic brake. When the actual positions are different by a predetermined value or more, any of the issue of a motor torque to maintain the position, the actuation of a regenerative brake, or a control means for continuing a control to maintain the position without operating the electromagnetic brake, even if the servomotor stops for a certain period of time during play-back operation, is performed.

4 Claims, 5 Drawing Sheets

(56) References Cited

OTHER PUBLICATIONS

English Abstract and Machine Translation for Japanese Publication No. 2012-213844 A, published Nov. 8, 2012, 31 pgs.
English Abstract and Machine Translation for Japanese Publication No. 2000-047732 A, published Feb. 18, 2000, 10 pgs.
English Abstract and Machine Translation for Japanese Publication No. 11-180687 A, published Jul. 6, 1999, 9 pgs.

* cited by examiner

SERVOMOTOR CONTROL APPARATUS

BACKGROUND OF THE INVENTION

1. Field of the Invention

The present invention relates to a servomotor control apparatus, and in particular relates to a servomotor control apparatus that controls a machine having one or a plurality of movable portions each driven by a servomotor and that prevents the position of the machine from differing due to a brake malfunction.

2. Description of Related Art

In servomotor control apparatuses, a method for maintaining the posture of an arm by powering a motor, when an operation command is issued to the motor in a state in which a brake is operated and a reduction in braking performance is detected by a comparison between an operation amount of the motor and a predetermined threshold value, is proposed (for example, Japanese Unexamined Patent Publication (Kokai) No. 2005-254410).

However, according to this conventional art, the posture of the arm is maintained by powering the motor, only when the detection of the braking performance is performed and the reduction in the braking performance is detected. Thus, in the event that the brake is fully released due to a sudden brake failure or the like, the conventional art has no means to prevent the position of the machine from differing.

SUMMARY OF THE INVENTION

The present invention provides a servomotor control apparatus that prevents the position of a machine from differing due to a brake malfunction.

A servomotor control apparatus according to an embodiment of the present invention is a servomotor control apparatus that controls a machine having one or more movable portions each driven by a servomotor. In the servomotor control apparatus, in a state in which a servo amplifier is powered off and an electromagnetic brake is operated, an actual position obtained by a position detector is periodically monitored. When the actual position is different from an actual position at the time of actuating the electromagnetic brake by a predetermined value or more, an electromagnetic contactor of a servo feed circuit is closed to supply electric power to the servo amplifier and a motor torque command is issued to maintain the position.

A servomotor control apparatus according to another embodiment of the present invention is a servomotor control apparatus that controls a machine having one or more movable portions each driven by a servomotor. In the servomotor control apparatus, in a state in which a servo amplifier is powered on and an electromagnetic brake is operated, an actual position obtained by a position detector is periodically monitored. When the actual position is different from an actual position at the time of actuating the electromagnetic brake by a predetermined value or more, an electromagnetic contactor of a servo feed circuit is opened to power off the servo amplifier and a regenerative brake operation command is issued.

A servomotor control apparatus according to yet another embodiment of the present invention is a servomotor control apparatus that controls a machine having one or more movable portions each driven by a servomotor. In the servomotor control apparatus, in a state in which an electromagnetic brake is operated, an actual position obtained by a position detector is periodically monitored. In a case where the actual position is different from an actual position at the time of actuating the electromagnetic brake by a predetermined value or more, a control means that operates the electromagnetic brake and stops an issue of a motor torque is disabled, when the servomotor does not operate for a certain period of time.

Furthermore, in the servomotor control apparatus according to the above embodiments, the predetermined value, which is used for determining whether or not a current actual position fed back from the position detector is different from an actual position at the time of actuating the electromagnetic brake, is set lower than a position abnormality determination threshold value for determining a position abnormality between a command position of the servomotor and the actual position fed back from the position detector during normal operation.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A servomotor control apparatus according to the present invention will be described below with reference to the drawings.

First Embodiment

Figure 1:
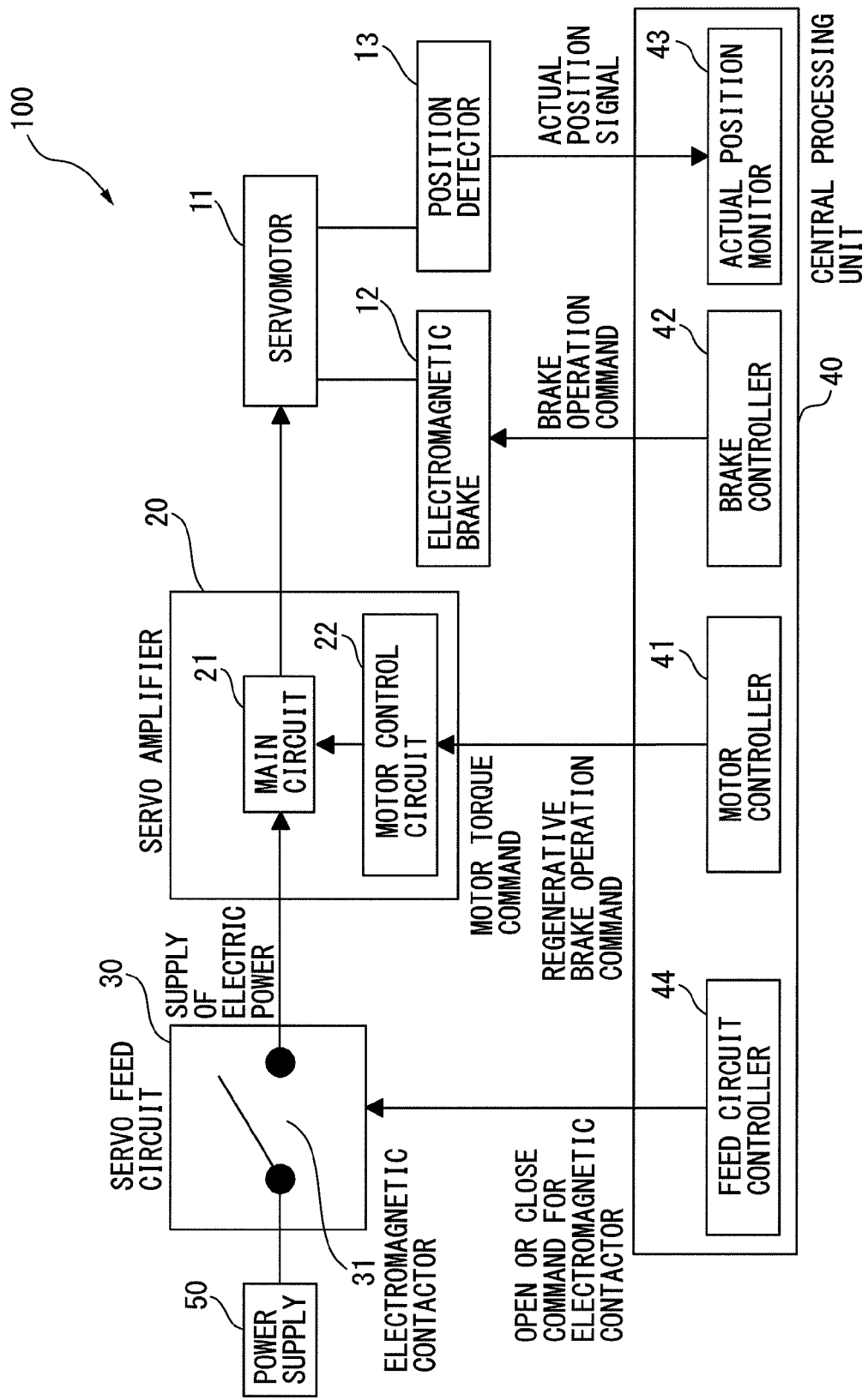
FIG. 1 is a block diagram of essential portions of a servomotor control apparatus and a control system for a servomotor according to a first embodiment of the present invention.

FIG. 1 is a block diagram of a servomotor control apparatus and a control system for a servomotor according to a first embodiment of the present invention. A servomotor control apparatus 100 according to the first embodiment of the present invention includes one or more servomotors 11 each for driving a movable portion of a machine tool or robot (not-shown), an electromagnetic brake 12 for maintaining the position of the machine, a position detector 13 for feeding back an actual position signal, a servo amplifier 20 for driving the servomotor 11, a servo feed circuit 30 for powering the servo amplifier 20, and a central processing unit 40 for commanding and monitoring the servomotor 11.

The servomotor 11 is provided with an encoder as the position detector 13, which detects an actual position of the servomotor 11 and feeds back the actual position to the central processing unit 40, and the electromagnetic brake 12 for maintaining a stop position.

The servo amplifier 20 includes a main circuit 21 constituted of a inverter circuit (not-shown), a capacitor as a charger and discharger, and the like, and a motor control circuit 22 for controlling the servomotor 11 based on an operation command issued from the central processing unit 40.

The servo amplifier 20 converts a direct current voltage of a power supply 50, which is supplied through the servo feed circuit 30, into an alternating current voltage using the inverter circuit (not-shown) contained in the main circuit 21, and supplies electric power to the servomotor 11.

On the other hand, when operating a regenerative brake, energy is regenerated from the servomotor 11 to the servo amplifier 20. The energy is charged into the capacitor (not-shown) in the main circuit 21 or consumed as heat by a resistor (not-shown) in the main circuit 21, thus obtaining a torque to brake the servomotor 11.

The servo feed circuit 30 includes an electromagnetic contactor 31 that switches the supply of electric power to the servo amplifier 20. The servo feed circuit 30 opens and closes the electromagnetic contactor 31 in response to an open or close command from the central processing unit 40.

The central processing unit 40 includes a motor controller 41, a brake controller 42, an actual position monitor 43, and a feed circuit controller 44. The motor controller 41 issues a control command for the servomotor 11. The brake controller 42 issues a brake operation command for the electromagnetic brake 12. The actual position monitor 43 periodically monitors an actual position based on actual position data fed back from the position detector 13 and determines a difference in position. The feed circuit controller 44 controls the open and close of the electromagnetic contactor 31 of the servo feed circuit 30 in order to control the supply of electric power to the servo amplifier 20.

The control command generated by the motor controller 41 includes at least one of a motor torque command to maintain the position and a regenerative brake operation command.

The actual position monitor 43 determines a malfunction in the electromagnetic brake 12 by reference to actual positions of the servomotor 11 based on the brake operation command generated by the brake controller 42 and the actual position signal fed back from the position detector 13. To be more specific, while the electromagnetic brake 12 is operated, the actual position monitor 43 periodically monitors an actual position and compares the actual position with an actual position at the time of actuating the electromagnetic brake 12. When a difference equal to or more than a predetermined value is detected by the comparison, a malfunction is determined.

Figure 2:
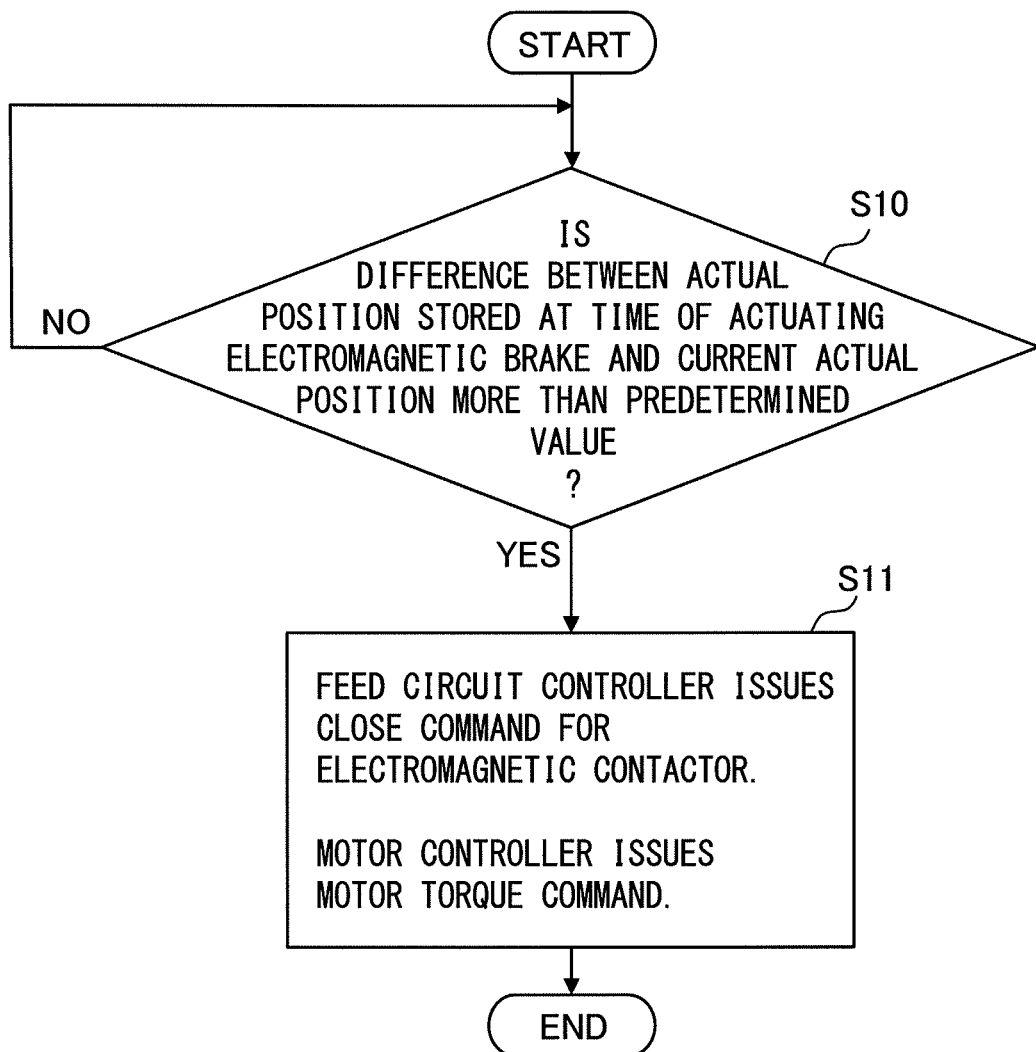
FIG. 2 is a flowchart of a malfunction detection in an electromagnetic brake and a subsequent step according to the first embodiment of the present invention.

Referring to FIG. 2, a malfunction detection in the electromagnetic brake and a subsequent step by the servomotor control apparatus according to the first embodiment of the present invention will be described.

When the servo amplifier 20 is powered off and the electromagnetic brake 12 is operated to maintain the position, in step S10, the actual position monitor 43 periodically monitors an actual position obtained by the position detector 13 and compares the actual position with an actual position that is stored at the time of actuating the electromagnetic brake 12.

When a difference equal to or more than a predetermined value is detected by the comparison, in step S11, the feed circuit controller 44 issues a command signal to close a contact of the electromagnetic contactor 31, so that the servo amplifier 20 is powered on. The motor controller 41 issues a motor torque signal to maintain the position of the servomotor 11. At this time, a signal indicating a malfunction may be outputted to inform a user of the malfunction.

According to the servomotor control apparatus of the first embodiment of the present invention, an actual position obtained by the position detector is periodically monitored. When the actual position is different from an actual position at the time of actuating the electromagnetic brake by a predetermined value or more, electric power is supplied to the servo amplifier and a motor torque is issued to maintain the position. Therefore, it is possible to maintain the position of the machine even if the electromagnetic brake is fully released due to a malfunction in the electromagnetic brake.

Second Embodiment

A servomotor control apparatus according to a second embodiment of the present invention will be described. The difference between the servomotor control apparatus according to the second embodiment of the present invention and the servomotor control apparatus according to the first embodiment is that in a state in which the servo amplifier 20 is powered on and the electromagnetic brake 12 is operated to maintain a position, when an actual position monitored by the position detector 13 is different from an actual position at the time of actuating the electromagnetic brake 12 by a predetermined value or more, the electromagnetic contactor 31 is opened to power off the servo amplifier 20 and a regenerative brake operation command is issued. The other configurations of the servomotor control apparatus according to the second embodiment of the present invention are the same as those of the servomotor control apparatus shown in FIG. 1 according to the first embodiment of the present invention, so a detailed description thereof will be omitted.

Figure 3:
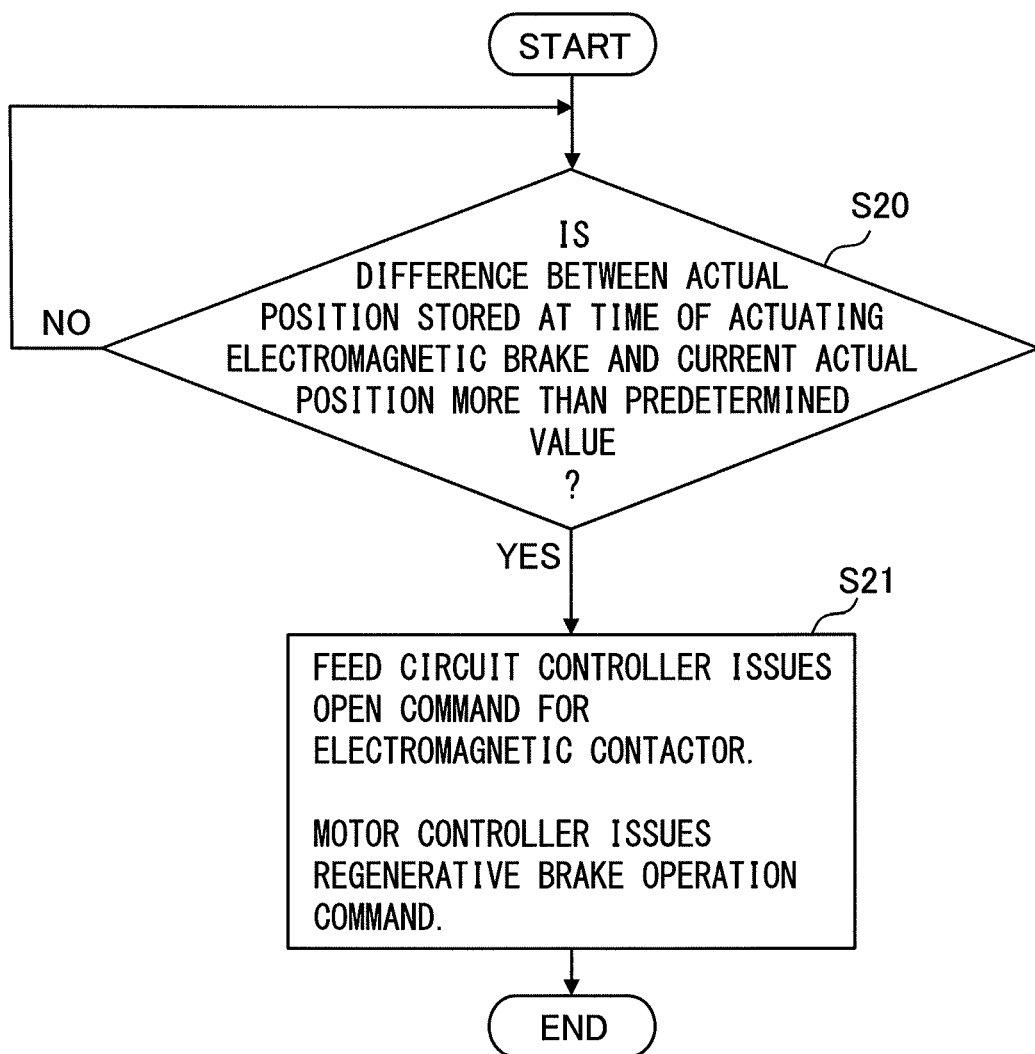
FIG. 3 is a flowchart of a malfunction detection in an electromagnetic brake and a subsequent step according to a second embodiment of the present invention.

Referring to FIG. 3, a malfunction detection in the electromagnetic brake and a subsequent step by the servomotor control apparatus according to the second embodiment of the present invention will be described.

In a state in which the servo amplifier 20 is powered on and the electromagnetic brake 12 is operated, in step S20, the actual position monitor 43 periodically monitors an actual position obtained by the position detector 13 and compares the actual position with an actual position that is stored at the time of actuating the electromagnetic brake 12.

When a difference equal to or more than a predetermined value is detected by the comparison, in step S21, the feed circuit controller 44 issues a command signal to open the contact of the electromagnetic contactor 31, so that the servo amplifier 20 is powered off. The motor controller 41 issues a regenerative brake operation command. At this time, a signal indicating a malfunction may be outputted to inform a user of the malfunction.

According to the servomotor control apparatus of the second embodiment of the present invention, an actual position obtained by the position detector is periodically monitored. When the actual position is different from an actual position at the time of actuating the electromagnetic brake by a predetermined value or more, the servo amplifier is powered off and the regenerative brake is actuated. Therefore, it is possible to maintain the position of the machine even if the electromagnetic brake is fully released due to a malfunction in the electromagnetic brake.

Third Embodiment

Figure 4:
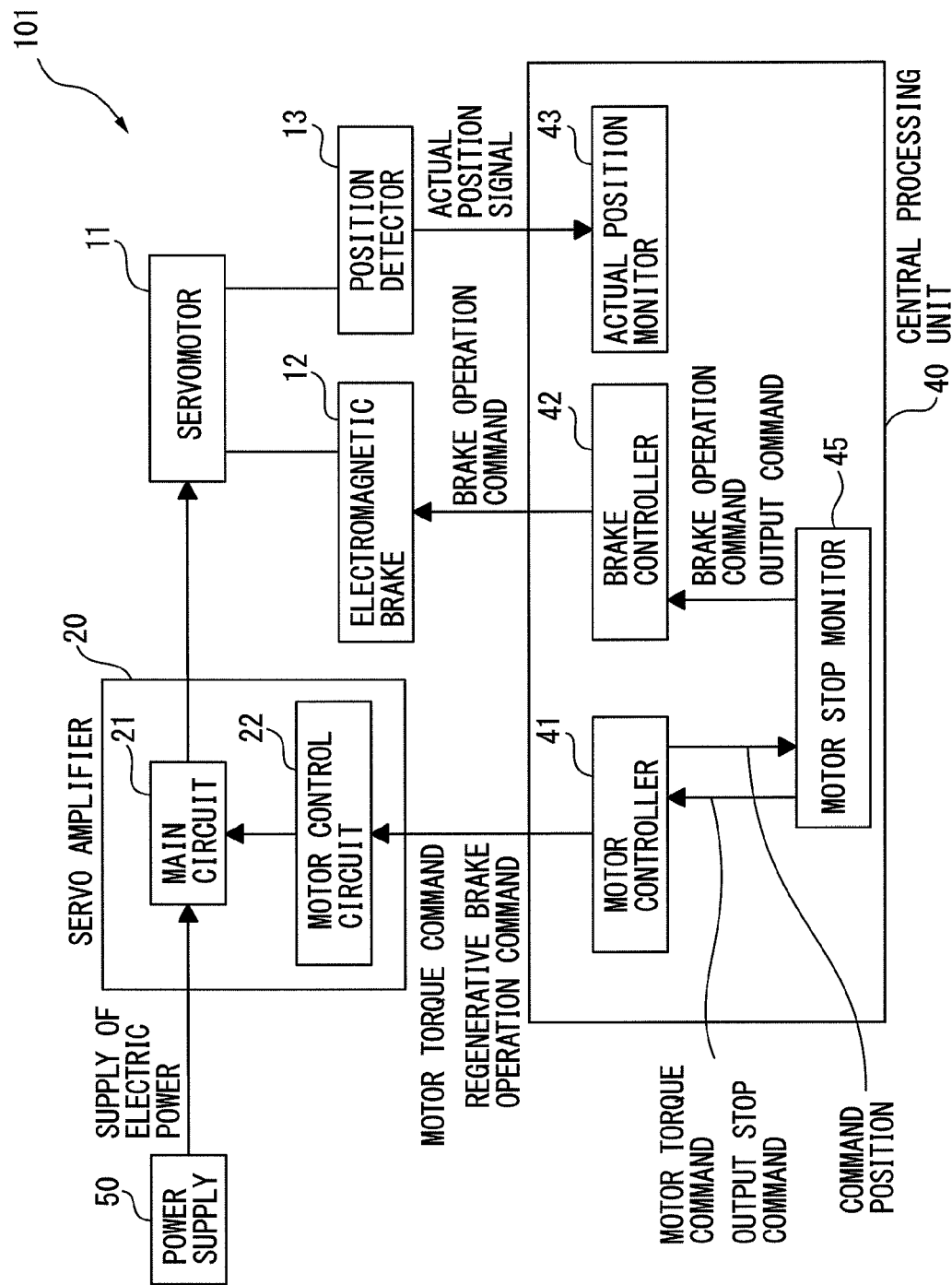
FIG. 4 is a block diagram of essential portions of a servomotor control apparatus and a control system for a servomotor according to a third embodiment of the present invention.

FIG. 4 is a block diagram of a servomotor control apparatus and a control system for a servomotor according to a third embodiment of the present invention. A servomotor control apparatus 101 according to the third embodiment of the present invention includes one or more servomotors 11 each for driving a movable portion of a machine tool or robot (not-shown), an electromagnetic brake 12 for maintaining the position of the machine, a position detector 13 for feeding back an actual position signal, a servo amplifier 20 for driving the servomotor 11, and a central processing unit 40 for commanding and monitoring the servomotor 11.

The servomotor 11 is provided with an encoder as the position detector 13, which detects an actual position of the servomotor 11 and feeds back the actual position to the central processing unit 40, and the electromagnetic brake 12 for maintaining a stop position.

The servo amplifier 20 includes a main circuit 21 constituted of a inverter circuit (not-shown), a capacitor as a charger and discharger, and the like, and a motor control circuit 22 for controlling the servomotor 11 based on an operation command from the central processing unit 40.

The servo amplifier 20 converts a direct current voltage applied by a power supply 50 into an alternating current voltage using the inverter circuit (not-shown) in the main circuit 21, and supplies electric power to the servomotor 11.

On the other hand, when operating a regenerative brake, energy is regenerated from the servomotor 11 to the servo amplifier 20. The energy is charged into the capacitor (not-shown) in the main circuit 21 or consumed as heat by a resistor (not-shown) in the main circuit 21, thus obtaining torque to brake the servomotor 11.

The central processing unit 40 includes a motor controller 41, a brake controller 42, an actual position monitor 43, and a motor stop monitor 45. The motor controller 41 generates a command position of the servomotor 11 and issues a control command. The brake controller 42 issues a brake operation command for the electromagnetic brake 12. The actual position monitor 43 periodically monitors an actual position based on actual position data fed back from the position detector 13 and determines a difference in position. The motor stop monitor 45 periodically monitors the command position of the servomotor 11 generated by the motor controller 41 and determines a stop of the servomotor 11. When the servomotor 11 is determined to be stopped, the motor stop monitor 45 commands the brake controller 42 to issue the brake operation command and commands the motor controller 41 to stop issuing a motor torque command for maintaining the position. The control command generated by the motor controller 41 includes at least one of the motor torque command to maintain the position and a regenerative brake operation command.

The actual position monitor 43 determines a malfunction in the electromagnetic brake 12 by reference to actual positions of the servomotor 11 based on the brake operation command generated by the brake controller 42 and the actual position signal fed back from the position detector 13. To be more specific, while the electromagnetic brake 12 is operated, the actual position monitor 43 periodically monitors the actual position and compares the actual position with the actual position at the time of actuating the electromagnetic brake 12. When a difference equal to or more than a predetermined value is detected by the comparison, a malfunction is determined.

The motor stop monitor 45 determines whether or not the servomotor 11 is stopped by reference to the brake operation command generated by the brake controller 42 and the command position of the servomotor 11 generated by the motor controller 41. To be more specific, the motor stop monitor 45 periodically monitors the command position while the electromagnetic brake 12 is not operated. When the command position does not change for a certain period of time, the servomotor 11 is determined to be stopped.

Figure 5:
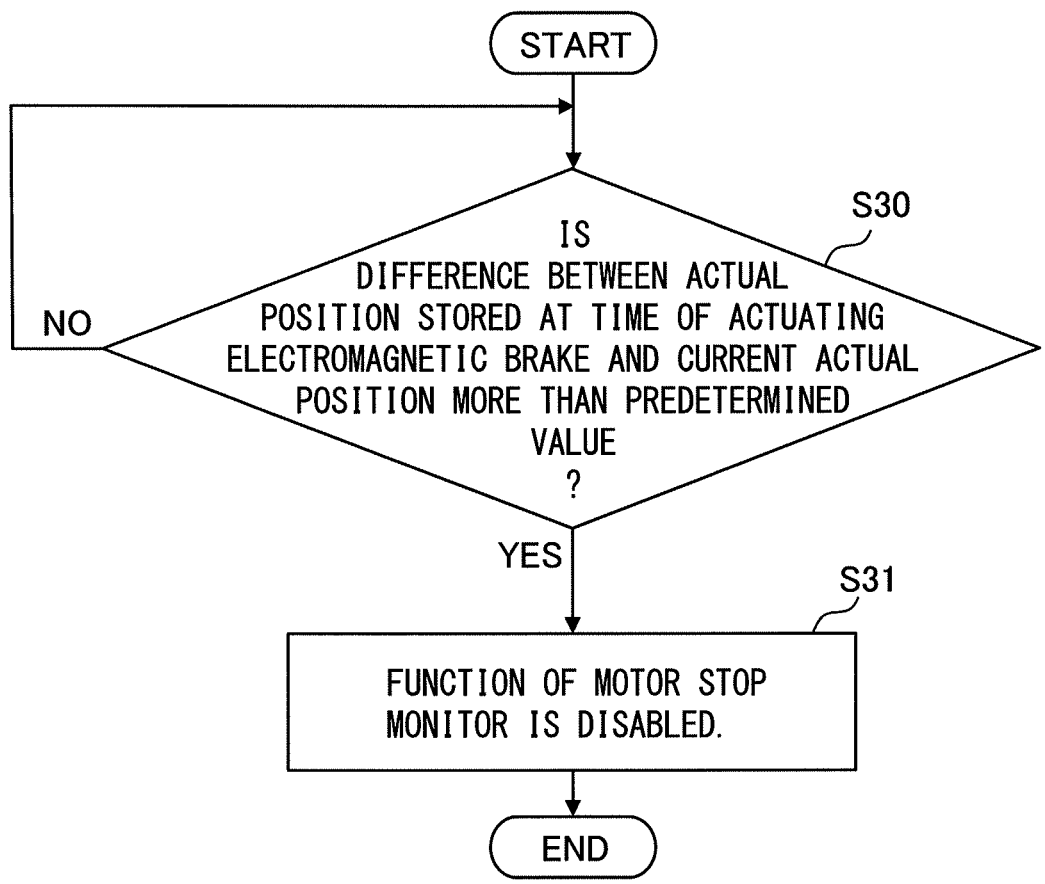
FIG. 5 is a flowchart of a malfunction detection in an electromagnetic brake and a subsequent step according to the third embodiment of the present invention.

Referring to FIG. 5, a malfunction detection in the electromagnetic brake and a subsequent step by the servomotor control apparatus according to the third embodiment of the present invention will be described.

In a state in which the electromagnetic brake 12 is operated, in step S30, the actual position monitor 43 periodically monitors an actual position obtained by the position detector 13 and compares the actual position with the actual position that is stored at the time of actuating the electromagnetic brake 12.

When a difference equal to or more than a predetermined value is detected by the comparison, in step S31, the function of the motor stop monitor 45 is disabled. At this time, a signal indicating a malfunction may be outputted to inform a user of the malfunction.

In the embodiments described above, the predetermined value is preferably lower than a position abnormality determination threshold value for determining a position abnormality between the command position of the servomotor 11 and the actual position of the servomotor 11 fed back from the position detector 13 during normal operation.

According to the servomotor control apparatus of the third embodiment of the present invention, an actual position obtained by the position detector is periodically monitored. In a case where the actual position is different from the actual position at the time of actuating the electromagnetic brake by a predetermined value or more, a motor torque is continued to be outputted without operating the electromagnetic brake, even if the servomotor does not operate for a certain period of time. Therefore, in the event of detecting a malfunction in the electromagnetic brake even once, it is possible to prevent the electromagnetic brake from being operated unintendedly and the output of a motor torque from being stopped unintendedly, before they happen.

Moreover, in the servomotor control apparatuses according to the embodiments of the present invention, the threshold value to determine whether or not the servomotor operates is set lower than the position abnormality determination threshold value used during the normal operation, thus allowing the quick detection of a change in the position of the machine.

What is claimed is:
1. A servomotor control apparatus comprising:
one or more servomotors each for driving a movable portion of a machine;
an electromagnetic brake for maintaining the position of the machine;
a position detector for feeding back an actual position signal;
a servo amplifier for driving the servomotor;
a servo feed circuit for supplying electric power to the servo amplifier; and
a central processing unit for commanding and monitoring the servomotor, wherein
the servo feed circuit has an electromagnetic contactor for switching the supply of the electric power to the servo amplifier,
the central processing unit has a motor controller for generating a command position of the servomotor and issuing at least one of a motor torque command to maintain the position based on the generated command position and a regenerative brake operation command, an actual position monitor for periodically monitoring an actual position fed back from the position detector, and a feed circuit controller for controlling the supply of the electric power to the servo amplifier, and in a state in which the servo amplifier is powered off and the electromagnetic brake is operated to maintain the position, when the actual position monitored by the actual position monitor is different from the actual position at the time of actuating the electromagnetic brake by a predetermined value or more, the electromagnetic contactor is closed to supply the electric power to the servo amplifier and the motor torque command is issued to maintain the position.

2. The servomotor control apparatus according to claim 1, wherein the predetermined value is lower than a position abnormality determination threshold value for determining a position abnormality between the command position of the servomotor and the actual position fed back from the position detector during normal operation.

3. A servomotor control apparatus comprising:
one or more servomotors each for driving a movable portion of a machine;
an electromagnetic brake for maintaining the position of the machine;
a position detector for feeding back an actual position signal;
a servo amplifier for driving the servomotor;
a servo feed circuit for supplying electric power to the servo amplifier; and
a central processing unit for commanding and monitoring the servomotor, wherein
the servo feed circuit has an electromagnetic contactor for switching the supply of the electric power to the servo amplifier,
the central processing unit has a motor controller for generating a command position of the servomotor and issuing at least one of a motor torque command to maintain the position based on the generated command position and a regenerative brake operation command, an actual position monitor for periodically monitoring an actual position fed back from the position detector, and a feed circuit controller for controlling the supply of the electric power to the servo amplifier, and
in a state in which the servo amplifier is powered on and the electromagnetic brake is operated to maintain the position, when the actual position monitored by the actual position monitor is different from the actual position at the time of actuating the electromagnetic brake by a predetermined value or more, the electromagnetic contactor is opened to power off the servo amplifier and the regenerative brake operation command is issued.

4. A servomotor control apparatus comprising:
one or more servomotors each for driving a movable portion of a machine;
an electromagnetic brake for maintaining the position of the machine;
a position detector for feeding back an actual position signal;
a servo amplifier for driving the servomotor; and
a central processing unit for commanding and monitoring the servomotor, wherein
the central processing unit has a motor controller for generating a command position of the servomotor and issuing at least one of a motor torque command to maintain the position based on the generated command position and a regenerative brake operation command, a brake controller for issuing a brake operation command for the electromagnetic brake, an actual position monitor for periodically monitoring an actual position fed back from the position detector, and a motor stop monitor for periodically monitoring the command position of the servomotor generated by the motor controller and, when the command position does not change for a certain period of time, for commanding the brake controller to issue the brake operation command and the motor controller to stop the issue of the motor torque command to maintain the position, and
in a state in which the electromagnetic brake is operated to maintain the position, when the actual position monitored by the actual position monitor is different from the actual position at the time of actuating the electromagnetic brake by a predetermined value or more, the function of the motor stop monitor is disabled.

* * * * *